(12) United States Patent
Hedlund et al.

(10) Patent No.: US 11,597,187 B2
(45) Date of Patent: Mar. 7, 2023

(54) METHOD TO PRODUCE A VENEER ELEMENT AND A VENEER ELEMENT

(71) Applicant: Välinge Innovation AB, Viken (SE)

(72) Inventors: Anette Hedlund, Klippan (SE); Sofia Nilsson, Strandbaden (SE)

(73) Assignee: VALINGE INNOVATION AB, Viken (SE)

( * ) Notice: Subject to any disclaimer, the term of this patent is extended or adjusted under 35 U.S.C. 154(b) by 23 days.

(21) Appl. No.: 16/738,334

(22) Filed: Jan. 9, 2020

(65) Prior Publication Data

US 2020/0215799 A1 Jul. 9, 2020

(30) Foreign Application Priority Data

Jan. 9, 2019 (SE) .................................... 1950017-2
Jun. 5, 2019 (SE) .................................... 1950668-2

(51) Int. Cl.
*B32B 21/14* (2006.01)
*B32B 21/02* (2006.01)
(Continued)

(52) U.S. Cl.
CPC ................ *B32B 21/14* (2013.01); *B27N 3/06* (2013.01); *B27N 7/005* (2013.01); *B32B 21/02* (2013.01); *B32B 37/24* (2013.01); *E04F 13/10* (2013.01); *E04F 15/045* (2013.01); *E04F 15/107* (2013.01); *B32B 2264/0214* (2013.01); *B32B 2264/105* (2013.01); *B32B 2264/107* (2013.01); *B32B 2471/00* (2013.01)

(58) Field of Classification Search
CPC ......... B32B 21/14; B32B 21/02; B32B 37/24; B27N 3/06; B27N 7/005; E04F 13/10; E04F 15/045; E04F 15/107
See application file for complete search history.

(56) References Cited

U.S. PATENT DOCUMENTS 2,018,712 A 10/1935 Elmendorf
2,419,614 A 4/1947 Welch
(Continued)

FOREIGN PATENT DOCUMENTS

AU 80284/75 6/1975
AU 2011236087 A1 5/2013
(Continued)

OTHER PUBLICATIONS

U.S. Appl. No. 17/038,567, Marcus Bergelin, filed Sep. 30, 2020.
(Continued)

*Primary Examiner* — Linda L Gray
(74) *Attorney, Agent, or Firm* — Buchanan Ingersoll & Rooney P.C.

(57) ABSTRACT

A method to produce a veneer element, including defects and dense portions. The method includes providing a substrate, providing a sub-layer, including a binder and coloured filler particles, applying the sub-layer on a first surface of the substrate, applying a veneer layer on the sub-layer, and applying pressure, preferably heat and pressure, to the veneer layer and/or the substrate, thereby forming a veneer element wherein, after pressing, the sub-layer is visible through a defect of the veneer element such as crack, cavity, hole and/or knot of the veneer layer. Also, a veneer element.

17 Claims, 3 Drawing Sheets

(51) Int. Cl.
*B27N 3/06* (2006.01)
*B27N 7/00* (2006.01)
*E04F 15/10* (2006.01)
*E04F 15/04* (2006.01)
*E04F 13/10* (2006.01)
*B32B 37/24* (2006.01)

(56) References Cited

U.S. PATENT DOCUMENTS

| | | |
|---|---|---|
| 2,587,064 A | 2/1952 | Rapson |
| 2,630,395 A | 3/1953 | McCullough |
| 2,634,534 A | 4/1953 | Brown |
| 2,695,857 A | 11/1954 | Lewis et al. |
| 2,720,478 A | 10/1955 | Hogg |
| 2,831,793 A | 4/1958 | Elmendorf |
| 2,831,794 A | 4/1958 | Elmendorf |
| 2,932,596 A | 4/1960 | Rayner |
| 2,962,081 A | 11/1960 | Dobry et al. |
| 2,992,152 A | 7/1961 | Chapman |
| 3,032,820 A | 5/1962 | Johnson |
| 3,135,643 A | 6/1964 | Michl |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,392,082 A | 7/1968 | Lloyd |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,578,522 A | 5/1971 | Rauch |
| 3,615,279 A | 10/1971 | Ward, Jr. |
| 3,673,020 A | 6/1972 | De Jaeger |
| 3,729,368 A | 4/1973 | Ingham |
| 3,844,863 A | 10/1974 | Forsythe |
| 3,846,219 A | 11/1974 | Kunz |
| 3,880,687 A | 4/1975 | Elmendorf et al. |
| 3,895,984 A | 7/1975 | Cone et al. |
| 3,897,185 A | 7/1975 | Beyer |
| 3,897,588 A | 7/1975 | Nohtomi |
| 3,914,359 A | 10/1975 | Bevan |
| 3,950,599 A | 4/1976 | Board, Jr. |
| 3,956,542 A | 5/1976 | Roberti |
| 3,961,108 A | 6/1976 | Rosner et al. |
| 4,052,739 A | 10/1977 | Wada et al. |
| 4,093,766 A | 6/1978 | Scher et al. |
| 4,115,178 A | 9/1978 | Cone et al. |
| 4,126,725 A | 11/1978 | Shiflet |
| 4,131,705 A | 12/1978 | Kubinsky |
| 4,263,373 A | 4/1981 | McCaskey, Jr. et al. |
| 4,277,527 A | 7/1981 | Duhl |
| 4,311,621 A | 1/1982 | Nishizawa et al. |
| 4,313,857 A | 2/1982 | Blount |
| 4,337,290 A | 6/1982 | Kelly et al. |
| 4,361,612 A | 11/1982 | Shaner |
| 4,420,351 A | 12/1983 | Lussi |
| 4,420,525 A | 12/1983 | Parks |
| 4,430,375 A | 2/1984 | Scher et al. |
| 4,430,380 A | 2/1984 | Hönel |
| 4,474,920 A | 10/1984 | Kyminas et al. |
| 4,743,484 A | 5/1988 | Robbins |
| 4,863,777 A | 9/1989 | Callaway et al. |
| 4,872,825 A | 10/1989 | Ross |
| 4,890,656 A | 1/1990 | Ohsumi et al. |
| 4,911,969 A | 3/1990 | Ogata et al. |
| 4,942,084 A | 7/1990 | Prince |
| 5,034,272 A | 7/1991 | Lindgren et al. |
| 5,059,472 A | 10/1991 | LeBell et al. |
| 5,085,930 A | 2/1992 | Widmann et al. |
| 5,147,486 A | 9/1992 | Hoffman |
| 5,206,066 A | 4/1993 | Horacek |
| 5,246,765 A | 9/1993 | Lussi et al. |
| 5,258,216 A | 11/1993 | von Bonin et al. |
| 5,292,576 A | 3/1994 | Sanders |
| 5,314,554 A | 5/1994 | Owens |
| 5,354,259 A | 10/1994 | Scholz et al. |
| 5,405,705 A | 4/1995 | Fujimoto |
| 5,422,170 A | 6/1995 | Iwata et al. |
| 5,447,752 A | 9/1995 | Cobb |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,755,068 A | 5/1998 | Ormiston |
| 5,766,522 A | 6/1998 | Daly et al. |
| 5,827,788 A | 10/1998 | Miyakoshi |
| 5,855,832 A | 1/1999 | Clausi |
| 5,891,564 A | 4/1999 | Schultz et al. |
| 5,925,211 A | 7/1999 | Rakauskas |
| 5,925,296 A | 7/1999 | Leese |
| 5,942,072 A | 8/1999 | McKinnon |
| 5,976,689 A | 11/1999 | Witt et al. |
| 5,985,397 A | 11/1999 | Witt et al. |
| 6,036,137 A | 3/2000 | Myren |
| 6,089,297 A | 7/2000 | Shibagaki et al. |
| 6,103,377 A | 8/2000 | Clausi |
| 6,238,750 B1 | 5/2001 | Correll et al. |
| 6,291,625 B1 | 9/2001 | Hosgood |
| 6,468,645 B1 | 10/2002 | Clausi |
| 6,481,476 B1 | 11/2002 | Okamoto |
| 6,521,326 B1 | 2/2003 | Fischer et al. |
| 6,528,437 B1 | 3/2003 | Hepfinger et al. |
| 6,537,610 B1 | 3/2003 | Springer et al. |
| 6,620,349 B1 | 9/2003 | Lopez |
| 6,667,108 B2 | 12/2003 | Ellstrom |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Shuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,568,322 B2 | 8/2009 | Pervan |
| 7,678,425 B2 | 3/2010 | Oldorff |
| 7,811,489 B2 | 10/2010 | Pervan |
| 7,918,062 B2 | 4/2011 | Chen |
| 8,021,741 B2 | 9/2011 | Chen |
| 8,206,534 B2 | 6/2012 | McDuff et al. |
| 8,245,477 B2 | 8/2012 | Pervan |
| 8,302,367 B2 | 11/2012 | Schulte |
| 8,349,234 B2 | 1/2013 | Ziegler et al. |
| 8,349,235 B2 | 1/2013 | Pervan et al. |
| 8,407,963 B2 | 4/2013 | Schulte |
| 8,419,877 B2 * | 4/2013 | Pervan ............... B32B 37/1027 156/196 |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,499,520 B2 | 8/2013 | Schulte |
| 8,617,439 B2 | 12/2013 | Pervan et al. |
| 8,635,829 B2 | 1/2014 | Schulte |
| 8,650,738 B2 | 2/2014 | Schulte |
| 8,663,785 B2 | 3/2014 | Ziegler et al. |
| 8,728,564 B2 | 5/2014 | Ziegler et al. |
| 8,752,352 B2 | 6/2014 | Schulte |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,109,366 B2 | 8/2015 | Schulte |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |

(56) References Cited

U.S. PATENT DOCUMENTS

| | | |
|---|---|---|
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,981,362 B2 | 4/2021 | Ziegler et al. |
| 10,988,941 B2 | 4/2021 | Ziegler et al. |
| 11,040,371 B2 | 6/2021 | Jacobsson |
| 11,046,063 B2 | 6/2021 | Persson et al. |
| 11,072,156 B2 | 7/2021 | Schulte |
| 11,090,972 B2 | 8/2021 | Persson et al. |
| 11,135,814 B2 | 10/2021 | Pervan et al. |
| 11,167,533 B2 | 11/2021 | Ziegler et al. |
| 11,235,565 B2 | 2/2022 | Pervan et al. |
| 11,313,123 B2 | 4/2022 | Pervan et al. |
| 11,318,726 B2 | 5/2022 | Pervan et al. |
| 2001/0006704 A1 | 7/2001 | Chen et al. |
| 2001/0009309 A1 | 7/2001 | Taguchi et al. |
| 2002/0031620 A1 | 3/2002 | Yuzawa et al. |
| 2002/0054994 A1 | 5/2002 | Dupre et al. |
| 2002/0100231 A1 | 8/2002 | Miller |
| 2002/0155297 A1 | 10/2002 | Schuren |
| 2003/0008130 A1 | 1/2003 | Kaneko |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0108760 A1 | 6/2003 | Haas et al. |
| 2003/0208980 A1 | 11/2003 | Miller et al. |
| 2004/0035078 A1 | 2/2004 | Pervan |
| 2004/0088946 A1 | 5/2004 | Liang et al. |
| 2004/0123542 A1 | 7/2004 | Grafenauer |
| 2004/0137255 A1 | 7/2004 | Martinez et al. |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2004/0255541 A1 | 12/2004 | Thiers et al. |
| 2005/0003099 A1 | 1/2005 | Quist |
| 2005/0016107 A1 | 1/2005 | Rosenthal et al. |
| 2005/0079780 A1 | 4/2005 | Rowe et al. |
| 2005/0136234 A1 | 6/2005 | Hak et al. |
| 2005/0153150 A1 | 7/2005 | Wellwood et al. |
| 2005/0166514 A1 | 8/2005 | Pervan |
| 2005/0193677 A1 | 9/2005 | Vogel |
| 2005/0208255 A1 | 9/2005 | Pervan |
| 2005/0227040 A1 | 10/2005 | Toupalik |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0048474 A1 | 3/2006 | Pervan et al. |
| 2006/0070321 A1 | 4/2006 | Au |
| 2006/0070325 A1 | 4/2006 | Magnusson |
| 2006/0145384 A1 | 7/2006 | Singer |
| 2006/0154015 A1 | 7/2006 | Miller et al. |
| 2006/0156672 A1 | 7/2006 | Laurent et al. |
| 2006/0172118 A1 | 8/2006 | Han et al. |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0102108 A1 | 5/2007 | Zheng |
| 2007/0125275 A1 | 6/2007 | Bui |
| 2007/0148339 A1 | 6/2007 | Wescott |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000179 A1 | 1/2008 | Pervan et al. |
| 2008/0000190 A1 | 1/2008 | Håkansson |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0093013 A1 | 4/2008 | Muller |
| 2008/0152876 A1 | 6/2008 | Magnusson |
| 2008/0176039 A1 | 7/2008 | Chen et al. |
| 2008/0263985 A1 | 10/2008 | Hasch et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1 | 6/2009 | Pervan et al. |
| 2009/0165946 A1 | 7/2009 | Suzuki |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1 | 4/2010 | Pervan et al. |
| 2010/0136303 A1 | 6/2010 | Kreuder |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0304089 A1 | 12/2010 | Magnusson |
| 2010/0307675 A1 | 12/2010 | Buhlmann |
| 2010/0307677 A1 | 12/2010 | Buhlmann |
| 2010/0311854 A1 | 12/2010 | Thiers et al. |
| 2010/0314368 A1 | 12/2010 | Groeke |
| 2010/0319282 A1 | 12/2010 | Ruland |
| 2010/0323187 A1 | 12/2010 | Kalwa |
| 2010/0330376 A1 | 12/2010 | Trksak |
| 2011/0027501 A1 | 2/2011 | Guo |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0274872 A1 | 11/2011 | Yu |
| 2011/0283642 A1 | 11/2011 | Meirlaen et al. |
| 2011/0283650 A1 | 11/2011 | Pervan et al. |
| 2011/0287211 A1 | 11/2011 | Bailey et al. |
| 2011/0293823 A1 | 12/2011 | Bruderer et al. |
| 2011/0293906 A1 | 12/2011 | Jacobsson |
| 2012/0048487 A1 | 3/2012 | Brewster |
| 2012/0124932 A1 | 5/2012 | Schulte et al. |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0276348 A1 | 11/2012 | Clausi et al. |
| 2012/0279161 A1 | 11/2012 | Håkansson et al. |
| 2012/0288689 A1 | 11/2012 | Hansson et al. |
| 2012/0308774 A1 | 12/2012 | Persson et al. |
| 2013/0025216 A1 | 1/2013 | Reichwein et al. |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0196119 A1 | 8/2013 | Dobecz |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0027020 A1 | 1/2014 | Klaeusler et al. |
| 2014/0044872 A1 | 2/2014 | Pervan |
| 2014/0075874 A1 | 3/2014 | Pervan et al. |
| 2014/0147585 A1 | 5/2014 | Smith |
| 2014/0171554 A1 | 6/2014 | Ziegler et al. |

(56) References Cited

U.S. PATENT DOCUMENTS

| | | | |
|---|---|---|---|
| 2014/0178630 A1 | 6/2014 | Pervan et al. |
| 2014/0018661 A1 | 7/2014 | Pervan |
| 2014/0199558 A1 | 7/2014 | Pervan et al. |
| 2014/0234531 A1 | 8/2014 | Ziegler et al. |
| 2014/0290171 A1 | 10/2014 | Vermeulen |
| 2014/0329064 A1 | 11/2014 | Döhring et al. |
| 2015/0017461 A1 | 1/2015 | Lindgren et al. |
| 2015/0072111 A1 | 3/2015 | Rischer et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0118456 A1 | 4/2015 | Carlborg et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0297174 A1 | 10/2016 | Kim |
| 2016/0322041 A1 | 11/2016 | Kim |
| 2016/0326744 A1 | 11/2016 | Döhring et al. |
| 2016/0368180 A1 | 12/2016 | Ziegler et al. |
| 2016/0369507 A1 | 12/2016 | Pervan et al. |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Håkansson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0223197 A1 | 7/2020 | Hedlund et al. |
| 2021/0001647 A1 | 1/2021 | Pervan et al. |
| 2021/0008863 A1 | 1/2021 | Bergelin et al. |
| 2021/0078305 A1 | 3/2021 | Schulte |
| 2021/0010131 A1 | 4/2021 | Lindgren et al. |
| 2021/0197534 A1 | 7/2021 | Ziegler et al. |
| 2021/0277670 A1 | 9/2021 | Ziegler et al. |
| 2021/0323297 A1 | 10/2021 | Slottemo et al. |
| 2022/0009248 A1 | 1/2022 | Ryberg et al. |
| 2022/0024189 A1 | 1/2022 | Ziegler et al. |
| 2022/0024195 A1 | 1/2022 | Schulte |
| 2022/0063326 A1 | 3/2022 | Persson et al. |

FOREIGN PATENT DOCUMENTS

| | | | | |
|---|---|---|---|---|
| CH | 298894 A | | 5/1954 | |
| CN | 1709717 A | | 12/2005 | |
| CN | 201626012 U | * | 11/2010 | |
| CN | 102166775 A | | 8/2011 | |
| CN | 202200608 U | | 4/2012 | |
| CN | 104084994 A | | 10/2014 | |
| DE | 1 815 312 A1 | | 7/1969 | |
| DE | 7148789 U | | 4/1972 | |
| DE | 29 39 828 A1 | | 4/1981 | |
| DE | 33 34 921 A1 | | 4/1985 | |
| DE | 36 34 885 A1 | | 4/1988 | |
| DE | 42 33 050 A1 | | 4/1993 | |
| DE | 42 36 266 A1 | | 5/1993 | |
| DE | 9415345 U1 | * | 1/1995 | ............. E04B 13/18 |
| DE | 202 14 532 U1 | | 2/2004 | |
| DE | 102 45 914 A1 | | 4/2004 | |
| DE | 103 00 247 A1 | | 7/2004 | |
| DE | 103 31 657 A1 | | 2/2005 | |
| DE | 20 2006 007 797 U1 | | 8/2006 | |
| DE | 10 2005 046 264 A1 | | 4/2007 | |
| DE | 10 2006 024 593 A1 | | 12/2007 | |
| DE | 10 2006 058 244 A1 | | 6/2008 | |
| DE | 10 2007 043 202 A1 | | 3/2009 | |
| DE | 20 2009 008 367 A1 | | 9/2009 | |
| DE | 10 2010 045 266 A | | 3/2012 | |
| DE | 20 2013 011 776 U1 | | 7/2014 | |
| DE | 20 2014 102 031 U1 | | 7/2014 | |
| DE | 20 2013 012 020 U1 | | 2/2015 | |
| DE | 10 2013 113 125 A1 | | 5/2015 | |
| EP | 0 129 430 A2 | | 12/1984 | |
| EP | 0 234 220 A2 | | 9/1987 | |
| EP | 0 129 430 B1 | | 1/1990 | |
| EP | 0 355 829 A2 | | 2/1990 | |
| EP | 0 592 013 A2 | | 4/1994 | |
| EP | 0 611 408 A1 | | 8/1994 | |
| EP | 0 656 443 A1 | | 6/1995 | |
| EP | 0 611 408 B1 | | 9/1996 | |
| EP | 0 732 449 A1 | | 9/1996 | |
| EP | 0 744 477 A2 | | 11/1996 | |
| EP | 0 914 914 A2 | | 5/1999 | |
| EP | 0 732 449 B1 | | 8/1999 | |
| EP | 0 744 477 B1 | | 1/2000 | |
| EP | 0 993 934 A2 | | 4/2000 | |
| EP | 1 035 255 A1 | | 9/2000 | |
| EP | 1 125 971 A1 | | 8/2001 | |
| EP | 1 136 251 A2 | | 9/2001 | |
| EP | 1 209 199 A1 | | 5/2002 | |
| EP | 1 249 322 A1 | | 10/2002 | |
| EP | 1 262 607 A1 | | 12/2002 | |
| EP | 1 454 763 A2 | | 9/2004 | |
| EP | 1 242 702 B1 | | 11/2004 | |
| EP | 1 498 241 A2 | | 1/2005 | |
| EP | 1 584 378 A1 | | 10/2005 | |
| EP | 1 657 055 A1 | | 5/2006 | |
| EP | 1 681 103 A2 | | 7/2006 | |
| EP | 1 690 603 A1 | | 8/2006 | |
| EP | 1 847 385 A1 | | 10/2007 | |
| EP | 1 961 556 A1 | | 8/2008 | |
| EP | 1 997 623 A1 | | 12/2008 | |
| EP | 2 025 484 A1 | | 2/2009 | |
| EP | 1 454 763 B1 | | 8/2009 | |
| EP | 2 105 320 A1 | | 9/2009 | |
| EP | 2 119 550 A1 | | 11/2009 | |
| EP | 2 246 500 A2 | | 11/2010 | |
| EP | 2 263 867 A1 | | 12/2010 | |
| EP | 2 264 259 A2 | | 12/2010 | |
| EP | 2 272 667 A1 | | 1/2011 | |
| EP | 2 272 668 A1 | | 1/2011 | |
| EP | 2 305 462 A1 | | 4/2011 | |
| EP | 2 353 861 A1 | | 8/2011 | |
| EP | 1 847 385 B1 | | 9/2011 | |
| EP | 2 263 867 B1 | | 3/2012 | |
| EP | 2 902 196 A1 | | 8/2015 | |
| EP | 2 902 196 B1 | | 8/2016 | |
| FR | 801 433 A | | 8/1936 | |
| FR | 2 873 953 A1 | | 2/2006 | |
| GB | 785008 | | 10/1957 | |
| GB | 984 170 A | | 2/1965 | |
| GB | 1090450 | | 11/1967 | |
| GB | 1 561 820 A | | 3/1980 | |
| GB | 2 238 983 A | | 6/1991 | |
| GB | 2 248 246 A | | 4/1992 | |
| GB | 2 464 541 A | | 4/2010 | |
| JP | S51-128409 A | | 11/1976 | |
| JP | S52-087212 A | | 7/1977 | |
| JP | S53-148506 A | | 12/1978 | |
| JP | S56-049259 A | | 5/1981 | |
| JP | S56-151564 A | | 11/1981 | |
| JP | S58-084761 A | | 5/1983 | |
| JP | S59-101312 A | | 6/1984 | |
| JP | S64-062108 A | | 3/1989 | |

(56) References Cited

FOREIGN PATENT DOCUMENTS

| | | |
|---|---|---|
| JP | H02-188206 A | 7/1990 |
| JP | H02-198801 A | 8/1990 |
| JP | H02-229002 A | 9/1990 |
| JP | H03-030905 A | 2/1991 |
| JP | H03-211047 A | 9/1991 |
| JP | H03-267174 A | 11/1991 |
| JP | H04-107101 A | 4/1992 |
| JP | H04-247901 A | 9/1992 |
| JP | H04-269506 A | 9/1992 |
| JP | H05-077362 A | 3/1993 |
| JP | H05-237809 A | 9/1993 |
| JP | H06-312406 A | 11/1994 |
| JP | H07-060704 A | 3/1995 |
| JP | H08-207012 A | 8/1996 |
| JP | H09-164651 A | 6/1997 |
| JP | H10-002098 A | 1/1998 |
| JP | H10-18562 A | 1/1998 |
| JP | H10-086107 A | 4/1998 |
| JP | 2925749 B2 | 7/1999 |
| JP | H11-291203 A | 10/1999 |
| JP | 2000-226931 A | 8/2000 |
| JP | 2000-263520 A | 9/2000 |
| JP | 2001-287208 A | 10/2001 |
| JP | 2001-329681 A | 11/2001 |
| JP | 2003-311717 A | 11/2003 |
| JP | 2003-311718 A | 11/2003 |
| JP | 2004-068512 A | 3/2004 |
| JP | 2004-076476 A | 3/2004 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-098755 A | 4/2007 |
| JP | 2007-216692 A | 8/2007 |
| JP | 2007-268843 A | 10/2007 |
| JP | 2008-188826 A | 8/2008 |
| JP | 2010-017963 A | 1/2010 |
| JP | 2011-110768 A | 6/2011 |
| KR | 10-0997149 B1 | 11/2010 |
| KR | 10-1439066 B1 | 9/2014 |
| NZ | 225556 A1 | 2/1992 |
| SE | 469 326 B | 6/1993 |
| WO | WO 92/06832 A1 | 4/1992 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | WO 2004/050359 A1 | 6/2004 |
| WO | WO 2004/067874 A2 | 8/2004 |
| WO | WO 2005/035209 A2 | 4/2005 |
| WO | WO 2005/035209 A3 | 4/2005 |
| WO | WO 2005/035209 B1 | 4/2005 |
| WO | WO 2005/054599 A1 | 6/2005 |
| WO | WO 2005/054600 A1 | 6/2005 |
| WO | WO 2005/066431 A2 | 7/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | WO 2006/013469 A1 | 2/2006 |
| WO | WO 2006/042651 A1 | 4/2006 |
| WO | WO 2006/043893 A1 | 4/2006 |
| WO | WO 2006/126930 A1 | 11/2006 |
| WO | WO 2007/042258 A | 4/2007 |
| WO | WO 2007/059294 A2 | 5/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/148771 A1 | 12/2008 |
| WO | WO 2009/065768 A1 | 5/2009 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/046698 A1 | 4/2010 |
| WO | WO 2010/087752 A1 | 8/2010 |
| WO | WO 2011/058233 A1 | 5/2011 |
| WO | WO 2011/129755 A2 | 10/2011 |
| WO | WO 2011/129757 A1 | 10/2011 |
| WO | WO 2011/141851 A2 | 11/2011 |
| WO | WO 2012/004699 A2 | 1/2012 |
| WO | WO-2012141647 A1 * 10/2012 ............... B27K 3/15 |
| WO | WO 2013/079950 A1 | 6/2013 |
| WO | WO 2013/167576 A2 | 11/2013 |
| WO | WO 2013/182191 A2 | 12/2013 |
| WO | WO 2013/182191 A3 | 12/2013 |
| WO | WO 2014/017972 A1 | 1/2014 |
| WO | WO 2014/109699 A1 | 7/2014 |
| WO | WO 2015/078434 A1 | 6/2015 |
| WO | WO 2015/105455 A1 | 7/2015 |
| WO | WO 2015/105456 A1 | 7/2015 |
| WO | WO 2015/174909 A1 | 11/2015 |
| WO | WO 2016/151435 A1 | 9/2016 |

OTHER PUBLICATIONS

U.S. Appl. No. 17/090,511, Guido Schulte, filed Nov. 5, 2020.
U.S. Appl. No. 17/038,567, Bergelin, et al.
U.S. Appl. No. 17/090,511, Schulte.
Bergelin, Marcus, et al., U.S. Appl. No. 17/038,567 entitled "Veneered Element and Method of Producing Such a Veneered Element," filed Sep. 30, 2020.
Schulte, Guido, U.S. Appl. No. 17/090,511 entitled "Floor, Wall, or Ceiling Panel and Method for Producing Same," filed Nov. 5, 2020.
U.S. Appl. No. 17/202,836, Göran Ziegler, filed Mar. 16, 2021.
U.S. Appl. No. 17/205,469, Göran Ziegler, filed Mar. 18, 2021.
U.S. Appl. No. 17/232,687, Andreas Slottemo, filed Apr. 16, 2021.
U.S. Appl. No. 17/202,836, Ziegler et al.
U.S. Appl. No. 17/205,469, Ziegler et al.
U.S. Appl. No. 17/232,687, Slottemo et al.
Ziegler, Göran, et al., U.S. Appl. No. 17/202,836 entitled "Method to Produce a Veneered Element and a Veneered Element," filed Mar. 16, 2021.
Ziegler, Göran, et al., U.S. Appl. No. 17/205,469 entitled "Method of Producing a Veneered Element," filed Mar. 18, 2021.
Slottemo, Andreas, et al., U.S. Appl. No. 17/232,687 entitled "Method for Producing a Building Element, a Pressing Device and a Method of Embossing a Wooden Surface," filed Apr. 16, 2021.
U.S. Appl. No. 14/593,458, Göran Ziegler, filed Jan. 9, 2015, (Cited herein as US Patent Application Publication No. 2015/0197943 A1 of Jul. 16, 2015).
U.S. Appl. No. 15/183,424, Darko Pervan, filed Jun. 22, 2016, (Cited herein as US Patent Application Publication No. 2016/0369507 A1 of Dec. 22, 2016).
U.S. Appl. No. 15/496,357, Marcus Bergelin, filed Apr. 25, 2017, (Cited herein as US Patent Application Publication No. 2017/0305119 A1 of Oct. 26, 2017).
U.S. Appl. No. 15/039,748, Guido Schulte, filed May 26, 2016, (Cited herein as US Patent Application Publication No. 2016/0375674 A1 of Dec. 29, 2016).
U.S. Appl. No. 16/132,977, Darko Pervan, filed Sep. 17, 2018, (Cited herein as US Patent Application Publication No. 2019/0010711 A1 of Jan. 10, 2019).
U.S. Appl. No. 16/223,708, Göran Ziegler, filed Dec. 18, 2018, (Cited herein as US Patent Application Publication No. 2019/0210329 A1 of Jul. 11, 2019).
U.S. Appl. No. 16/233,833, Göran Ziegler, filed Dec. 18, 2018, (Cited herein as US Patent Application Publication No. 2019/0210330 A1 of Jul. 11, 2019).
U.S. Appl. No. 16/325,543, Göran Ziegler, filed Feb. 14, 2019,

(56) References Cited

OTHER PUBLICATIONS (Cited herein as US Patent Application Publication No. 2019/0202178 A1 of Jul. 4, 2019).
U.S. Appl. No. 16/365,764, Christer Lundblad, Per Nygren, Thomas Meijer, and Göran Ziegler, filed Mar. 27, 2019, (Cited herein as US Patent Application Publication No. 2020/0055287 A1 of Feb. 20, 2020).
U.S. Appl. No. 16/556,289, Guido Schulte, filed Aug. 30, 2019, (Cited herein as US Patent Application Publication No. 2020/0094512 A1 of Mar. 26, 2020).
U.S. Appl. No. 16/571,547, Guido Schulte, filed Sep. 16, 2019, (Cited herein as US Patent Application Publication No. 2020/0079059 A1 of Mar. 12, 2020).
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
BTLSR Toledo, Inc. website. http://www.btlresins.com/more.html. "Advantages to Using Powdered Resins," May 26, 2007, 2 pages, per the Internet Archive WayBackMachine.
Fang, Chang-Hua, et al., "Densification of wood veneers by compression combined with heat and steam," *Eur. J. Wood Prod.*, 2012, pp. 155-163, vol. 70, Springer-Verlag, Germany (available online Feb. 1, 2011).
Floor Daily, "Shaw Laminates: Green by Design," Aug. 13, 2007, 1 pg, Dalton, GA.
Le Fur, X., et al., "Recycling melamine-impregnated paper waste as board adhesives," published online Oct. 26, 2004, pp. 419-423, vol. 62, Springer-Verlag, DE, XP055332791.
Lstiburek, Joseph, "BSD-106: Understanding Vapor Barriers," Apr. 15, 2011, *Building Science Corporation*, pp. 1-18; (retrieved Sep. 26, 2018 https://buildingscience.com/documents/digests/bsd-106-understanding-vapor-barriers).
Mercene Labs, official home page, retrieved Feb. 23, 2017, 3 pages, retrieved from the Internet: http://www.mercenelabs.com/technology/, according to the Internet Archive WayBack Machine this page was available on Jan. 22, 2013.
Mercene Labs, "Technology," retrieved Mar. 28, 2020, 2 pages, retrieved from the Internet https://web.archive.org/web/20160324064537/http://www.mercenelabs.com/technology/ according to the Internet Archive WayBack Machine this page was available on Mar. 24, 2016 (XP055674254).
Mercene Labs, "Technology," retrieved Mar. 28, 2020, 2 pages, retrieved from the Internet https://web.archive.org/web/20150204025422/http://www.mercenelabs.com:80/technology/ according to the Internet Archive WayBack Machine this page was available on Feb. 4, 2015 (XP055674258).
Mercene Labs, "Industrial coatings," retrieved Mar. 28. 2020, 2 pages, retrieved from the Internet https://web.archive.org/web/20140825055945/http://www.mercenelabs.com/products/coating-of-difficult-substrates/ according to the Internet Archive WayBack Machine this page was available on Aug. 25, 2014 (XP055674250).
Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.
Odian, George, "Principles of Polymerization," 1991, $3^{rd}$ Edition, 5 pages incl. pp. 122-123, John Wiley & Sons, Inc., New York, NY, USA.
Parquet International, "Digital Printing is still an expensive process," Mar. 2008, cover page/pp. 78-79, www.parkettmagazin.com.
International Search Report and Written Opinion, dated May 7, 2020 in PCT/SE2020/050007, ISA/SE, Patent-och registreringsverket, Stockholm, SE,19 pages.
Schulte, Guido, U.S. Appl. No. 17/352,942 entitled "Method for Producing a Floorboard," filed Jun. 21, 2021.
Ziegler, Göran, et al., U.S. Appl. No. 17/496,441 entitled "Method to Produce a Veneered Element and a Veneered Element," filed Oct. 7, 2021.
Nilsson, Magnus, et al., U.S. Appl. No. 17/543,962 entitled "Method to Produce a Veneered Element and a Veneered Element," filed Dec. 7, 2021.
Ziegler, Göran, et al., U.S. Appl. No. 17/697,417 entitled "Method to Produce a Building Panel and a Building Panel," filed Mar. 17, 2022.
Pervan, Darko, et al., U.S. Appl. No. 17/711,487 entitled "Wood Fibre Based Panel with a Surface Layer," filed Apr. 1, 2022.
Rittinge, Rickard, et al., U.S. Appl. No. 17/769,594 entitled "Wood Fibre Based Panel and a Method for Obtaining Such Panel," filed Apr. 15, 2022.
Ziegler, Göran, et al., U.S. Appl. No. 17/747,325 entitled "Method of Producing a Veneered Element," filed May 18, 2022.

\* cited by examiner

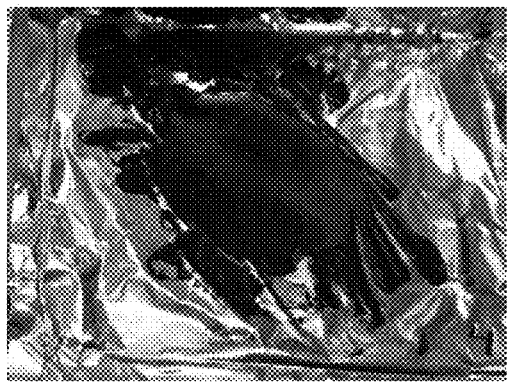
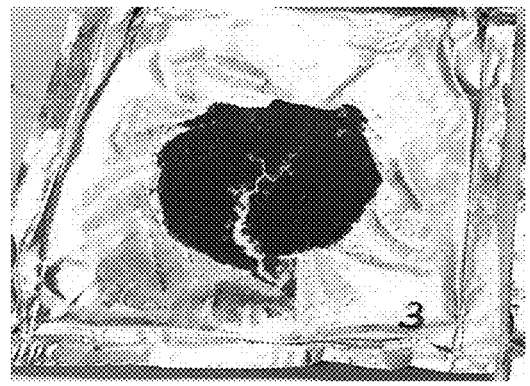
*Fig. 3A*  *Fig. 3B*
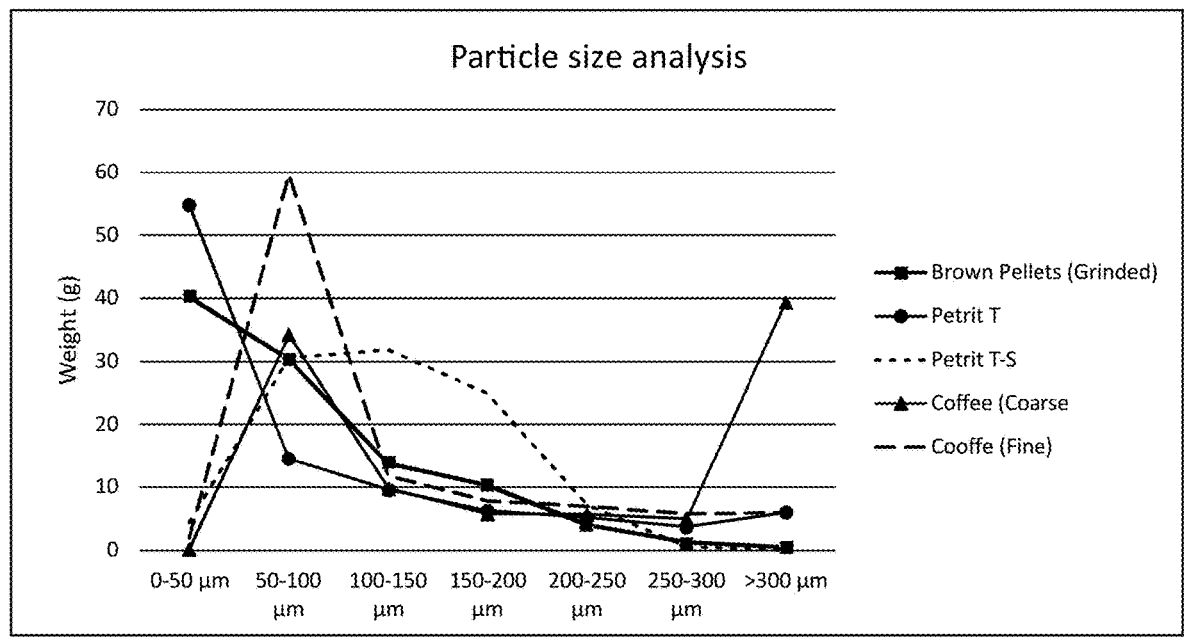
*Fig. 4*

METHOD TO PRODUCE A VENEER ELEMENT AND A VENEER ELEMENT

CROSS REFERENCE TO RELATED APPLICATIONS

The present application claims the benefit of Swedish Application No. 1950017-2, filed on Jan. 9, 2019, and the benefit of Swedish Application No. 1950668-2, filed on Jun. 5, 2019. The entire contents of each of Swedish Application No. 1950017-2 and Swedish Application No. 1950668-2 are hereby incorporated herein by reference in their entirety.

TECHNICAL FIELD

Embodiments of the present invention relate to a method to produce a veneer element and such a veneer element.

TECHNICAL BACKGROUND

Veneer layers may be used as a construction material, for example in the form of plywood. Plywood is formed of several veneer layers being glued together, for example with urea formaldehyde or phenol formaldehyde. The veneer layers are glued to each other in low pressure method in a temperature of about 140° C. and at a pressure about 10 bar. After pressing, the glue is present as a thin layer between the veneer layers. The veneer layers retain their original properties, including swelling and temperature expansion.

Veneer layers may also be used as a surface covering in panels. WO 2015/105455 discloses a building panel having a surface layer comprising a wood veneer and a sub-layer comprising wood fibres and a binder arranged between the surface layer and a wood fibre-based core. In the surface layer, material from the sub-layer extends into the wood veneer.

Veneer is made of wood and is not fully homogeneous in the structure and appearance. A visual appearance of the veneer depends on the type of wood used, the specific cut, the original colour or colouring elements used etc.

For example, there are hard and soft types of wood. Veneer element may be cut in such a way that it has a portion that may be recognized as a defect, both technologically or aesthetically. For example, the veneer may comprise a crack that occurred during cutting the veneer. Or the veneer may comprise a hole, such as a knot hole, thus being a defect naturally occurring the veneer.

Most often such veneers would be considered by the manufacture to be of low quality and go to waste or used for other applications.

Such veneers are not typically used in industry for at least the following reasons. If such wood veneers are glued directly onto the substrate, glue fills in the defects and the wood veneer has a number of spots having the colour of the glue used. Glue colour may be white and not matching the veneer colour, thus being visible as white spots on the surface of the wood veneer. Such an appearance in not aesthetically appealing to the consumer.

There have been attempts to colour the glue or the sub-layer positioned underneath the wood veneer in the building element or panel. However, it has been observed before that the dark colouring substances and in particular pigments are visible in the dense portions of the veneer layer after assembling the veneer layer under heat and pressure. An example of a veneer element comprising a core, a sub-layer and a wood veneer, wherein material from the sub-layer extends into the wood veneer is disclosed in US 2015/197942.

Therefore, there is a need for developing veneer elements, which will be aesthetically appealing to the consumer.

There is a need for providing a veneer element utilizing all types of wood veneers, including wood veneers that may have holes or cracks or other types of macroscopic openings.

SUMMARY

It is an object of at least embodiments of the present invention to provide an improvement over the above described techniques and known art.

A further object of at least embodiments of the present invention is to improve the wear resistance of a veneer surface.

A further object of at least embodiments of the present invention is to reduce the cost for producing surface with an attractive design.

A further object of at least embodiments of the present invention is to use veneers of low quality and/or thin thickness.

A further object of at least embodiments of the present invention is to provide a wood veneer surface having the look of a solid wood surface.

A further object of at least embodiments of the present invention is to provide a veneer surface having an attractive design.

A further object of at least embodiments of the present invention is to control the design of a veneer surface.

A further object of at least embodiments of the present invention is to control the colouration of a veneer.

A further object of at least embodiments is to reduce colouring of the veneer through pores in dense portions of the veneer.

According to a first aspect of the invention, a method to produce a veneer element is provided. The veneer element may comprise defects and dense portions. The method comprises:

providing a substrate,
providing a sub-layer, comprising a binder and coloured filler particles,
applying the sub-layer on a first surface of the substrate,
applying a veneer layer on the sub-layer, and
applying pressure, preferably heat and pressure, to the veneer layer and/or the substrate, thereby forming a coloured veneer element wherein, after pressing, the sub-layer is visible through a defect of the veneer element such as crack, cavity, hole and/or knot of the veneer layer.

By dense portions are meant solid portions of the veneer element. Solid portions of the veneer element may comprise portions having a porous structure, including microscopic openings, and portions being non-porous.

Hardwoods contain vessel elements, commonly referred to as pores. Softwoods completely lack vessels, and instead rely on tracheid. In the present disclosure, microscopic openings such as vessels and tracheid in solid wood are commonly referred to as pores and porous structure. Pore diameter depends on wood specie and, for ring-porous wood, earlywood and latewood pores. Pore diameter may be classified as small (<50 μm), medium (50-100 μm), large (100-200 μm), and very large (>200 μm) (www.wood-database.com/wood-articles/hardwood-anatomy/). A pore diameter may be less than 800 am in diameter. Pores may have a length of 300-600 μm and diameter of 30-130 μm.

By defects are meant macroscopic openings in the veneer element. Such macroscopic openings may be a crack, cavity, hole and/or knot hole. Such defects may be naturally occurring or may be formed during cutting the veneers, especially if cutting thin veneers as having a thickness of less than 1 mm. Such defects are visible to the human eye. Such macroscopic openings may be of a size in the range of 1 mm or more.

The veneer element may be a coloured veneer element. Portions of the veneer element is coloured by the coloured filler particles originating from the sub-layer. Said defects may form such coloured portions of the veneer layer.

The veneer layer may be a wood veneer layer.

In an aspect, a size of the coloured filler particle is at least 0.1 µm in diameter, preferably at least 1 µm in diameter, for example in the range of 0.1 to 300 µm in diameter.

In an aspect, an average size of the coloured filler particles may be at least 0.1 µm in diameter, preferably at least 1 µm in diameter, for example in the range of 0.1 to 300 µm in diameter.

An advantage of including coloured filler particles in the sub-layer is that coloured filler particles only colour defects of the veneer layer. Dense portions of the veneer layer remain substantially unaffected by the coloured filler particles after pressing. Thereby, the original veneer look remains substantially the same after pressing, essentially without being coloured by the coloured filler particles. However, defects such as crack, cavity, hole and/or knot hole are coloured by the coloured particles in the sub-layer after pressing.

The visual impression of the veneer layer after pressing is improved, by the veneer layer having the original veneer look at its solid portions, and any defect coloured by the coloured filler particles. It is desirable to colour defects with a dark colour, while it is undesirable to colour the solid portions of the veneer element with a dark colour.

When using conventional pigments in the sub-layer, it has been shown that pigment particles permeate through microscopic opening in porous portions of the dense portions, thereby colouring also the dense portions of the veneer layer, which is undesirable.

It has been shown that by including coloured filler particles, such as having a size of at least 0.1 µm in diameter, preferably at least 1 µm in diameter, that permeation of the coloured filler particles is at least reduced in dense portions of the veneer layer. Thereby, dense portions of the veneer layer remain substantially unaffected after pressing. Such dense portions may form uncoloured portions.

It has been shown that the binder of the sub-layer also influences whether or not particles from the sub-layer permeates through microscopic openings such as pores in the veneer layer. Even if the particle size is less than the size of the microscopic opening in porous portions of the dense portion of the veneer layer, the viscosity of the binder during pressing may be less than required for the binder to bring the particle through the veneer layer. The coloured filler particles used are too dense for the binder to bring them through the veneer layer and thereby permeate. However, pigments conventionally used easily follow the binder during pressing and permeates through dense portions of the veneer layer, thereby colouring also dense portions.

The coloured filler particles have a particle size larger than a particle size of conventional pigments.

The coloured filler particles may be dark coloured filler particles. By dark is meant having an L value (lightness value) less than 67, preferably less than 65, for example in the range of 67 to 0, in the CIELAB colour space model.

After pressing, said defects may form coloured portions and said dense portions may form non-coloured portions.

During pressing, a defect of the veneer layer such as a crack, cavity, hole and/or knot of the veneer layer may be at least partially filled with material originating from the sub-layer, comprising the coloured filler particles.

After pressing, the dense portions of the veneer layer may be substantially free from the coloured filler particles originating from the sub-layer. Thereby, the dense portions of the veneer layer are substantially unaffected by the sub-layer after pressing.

At least 70% of the coloured filler particles in the sub-layer may be of a size between 0.1 µm and 1 mm in diameter, preferably between 0.1 µm and 300 µm in diameter. Thereby, at least properties of the sub-layer are not substantially affected, however, permeation of the sub-layer into the dense portions of the veneer layer during pressing is at least partially prevented.

A size of the coloured filler particles may be at least 1 µm in diameter.

At least 70% of the coloured filler particles in the sub-layer may be of a size between 1 µm and 1 mm in diameter, preferably between 1 µm and 300 µm in diameter.

The coloured filler particles may be non-pigments. By non-pigments may be meant particles not being conventional pigments, such as titanium pigments, carbon black, iron oxide pigments, copper pigments, etc. An example of a commonly used titanium pigment is titanium dioxide. The coloured filler particles may be particles having a low capacity of changing the colour of reflecting, absorbing or transmitting light as a result of wavelength selective absorption. Consequently, coloured filler particles are not conventionally used in the meaning of pigment in the industry. Conventional pigments may have a size of less than 500 nm. Reflecting pigments, such as white pigments, have a comparably larger size (such as 300-400 nm) than absorbing pigments.

The veneer element may comprise no pigments.

The coloured filler particles may be provided in a dry form. The coloured filler particles may be applied on the substrate in a dry form.

The sub-layer may be provided in a dry form. The sub-layer may be applied on the substrate in a dry form.

The sub-layer may be provided in a wet form or as a slurry. The sub-layer may be applied on the substrate in a wet form or as a slurry.

The coloured filler particles may be organic filler particles, such as coffee, cacao vanilla, bark.

The coloured filler particles may be plastic particles, preferably dark plastic particles.

The coloured filler particles may be ceramic particles such as petrit T-S, xMT-1, perlite.

The coloured filler particles may be glossy metal particles, metallic powders, dark glass balls or other ceramic microspheres.

The coloured filler particles may be particles obtained by torrefaction of biomasses, such as wood fibres. Torrefied biomasses, an in particular wood fibres, has improved climate stability and are therefore suitable for use in the production of veneer element and in the veneer element.

The veneer layer may be a wood veneer layer. The wood veneer layer may be selected from oak, maple, birch, walnut, ash, pine.

The veneer layer may have a thickness of less than 1 mm, such as 0.2-0.8 mm.

The sub-layer may comprise wear resistant particles.

The binder may be a thermoplastic binder or thermosetting binder. The thermosetting binder may be an amino resin.

The veneer element may be a building panel.

The building panel may be a floor panel, a wall panel or a furniture panel.

The method may further comprise applying a balancing and/or décor layer on a second surface of the substrate opposite to the first surface of the substrate.

According to a second aspect, a veneer element is provided. The veneer element comprises a substrate, a sub-layer arranged on a first surface of the substrate, the sub-layer comprising a binder and coloured filler particles, the veneer layer being arranged on the sub-layer, wherein the sub-layer is visible through a defect of the veneer layer such as a crack, cavity, hole and/or knot.

The veneer layer may comprise defects and dense portions.

The veneer element may be formed by applying heat and/or pressure. After applying heat and/or pressure, the veneer element is formed.

By dense portions are meant solid portions of the veneer element. Solid portions of the veneer element may comprise portions having a porous structure, including microscopic openings, and portions being non-porous.

Hardwoods contain vessel elements, commonly referred to as pores. Softwoods completely lack vessels, and instead rely on tracheid. In the present disclosure, microscopic openings such as vessels and tracheid in solid wood are commonly referred to as pores and porous structure. Pore diameter depends of wood specie and, for ring-porous wood, earlywood and latewood pores. Pore diameter may be classified as small (<50 µm), medium (50-100 µm), large (100-200 µm), and very large (>200 µm) (https://www.wood-database.com/wood-articles/hardwood-anatomy/). A pore diameter may be less than 800 µm in diameter. Pores may have a length of 300-600 µm and diameter of 30-130 µm.

By defects are meant macroscopic openings in the veneer element. Such macroscopic openings may be a crack, cavity, hole and/or knot hole. Such defects may be naturally occurring or may be formed during cutting the veneers, especially if cutting thin veneers as having a thickness of less than 1 mm. Such defects are visible to the human eye. Such macroscopic openings may be of a size in the range of 1 mm or more.

The veneer element may be a coloured veneer element. Portions of the veneer element is coloured by the coloured filler particles originating from the sub-layer. Said defects may form such coloured portions of the veneer layer.

The veneer layer may be a wood veneer layer.

In an aspect, a size of the coloured filler particle is at least 0.1 µm in diameter, preferably at least 1 µm in diameter, for example in the range of 0.1 to 300 µm in diameter.

In an aspect, an average size of the coloured filler particles may be at least 0.1 µm in diameter, preferably at least 1 µm in diameter, for example in the range of 0.1 to 300 µm in diameter.

An advantage of including coloured filler particles in the sub-layer is that coloured filler particles only colour defects of the veneer layer. Dense portions of the veneer layer remain substantially unaffected by the coloured filler particles after pressing. Thereby, the original veneer look remains substantially the same after pressing, essentially without being coloured by the coloured filler particles. However, defects such as crack, cavity, hole and/or knot hole are coloured by the coloured particles in the sub-layer after pressing.

The visual impression of the veneer layer after pressing is improved, by the veneer layer having the original veneer look at its solid portions, and any defect coloured by the coloured filler particles. It is desirable to colour defects with a dark colour, while it is undesirable to colour the solid portions of the veneer element with a dark colour.

When using conventional pigments in the sub-layer, it has been shown that pigment particles permeate through microscopic opening in the dense portions, thereby colouring also the dense portions of the veneer layer, which is undesirable.

It has been shown that by including coloured filler particles, such as having a size of at least 0.1 µm in diameter, preferably at least 1 µm in diameter, that permeation of the coloured filler particles is at least reduced in porous portions of dense portions of the veneer layer. Thereby, dense portions of the veneer layer remain substantially unaffected after pressing. Such dense portions may form uncoloured portions.

It has been shown that the binder of the sub-layer also influences whether or not particles from the sub-layer permeates through microscopic openings such as pores in the veneer layer. Even if the particle size is less than the size of the microscopic opening in the porous portions of the dense portion of the veneer layer, the viscosity of the binder during pressing may be less than required for the binder to bring the particle through the veneer layer. The coloured filler particles used are too dense for the binder to bring them through the veneer layer and thereby permeate. However, pigments conventionally used easily follow the binder during pressing and permeates through dense portions of the veneer layer, thereby colouring also dense portions.

The coloured filler particles have a particle size larger than a particle size of conventional pigments.

The coloured filler particles may be dark coloured filler particles. By dark is meant having an L value (lightness value) less than 67, preferably less than 65, for example in the range of 67 to 0, in the CIELAB colour space model.

Said defects may form coloured portions and said dense portions may form non-coloured portions.

A defect such as a crack, cavity, hole and/or knot of the veneer layer may be at least partially filled with material originating from the sub-layer, comprising the coloured filler particles.

The dense portions of the veneer layer may be substantially free from the coloured filler particles originating from the sub-layer.

At least 70% of the coloured filler particles may be of a size between 0.1 µm and 1 mm in diameter, preferably between 0.1 µm and 300 µm in diameter.

A size of the coloured filler particles may be at least 1 µm in diameter.

At least 70% of the coloured filler particles in the sub-layer may be of a size between 1 µm and 1 mm in diameter, preferably between 1 µm and 300 µm in diameter.

The coloured filler particles may be non-pigments. By non-pigments may be meant particles not being conventional pigments, such as titanium pigments, carbon black, iron oxide pigments, copper pigments, etc. An example of a commonly used titanium pigment is titanium dioxide. The coloured filler particles may be particles having a low capacity of changing the colour of reflecting, absorbing or transmitting light as a result of wavelength selective absorption. Consequently, coloured filler particles are not conventionally used in the meaning of pigment in the industry. Conventional pigments may have a size of less than 500 nm.

Reflecting pigments, such as white pigments, have a comparably larger size (such as 300-400 nm) than absorbing pigments.

The veneer element may comprise no pigments.

The coloured filler particles maybe organic filler particles, such as coffee, cacao vanilla, bark.

The coloured filler particles may be dark plastic particles.

The coloured filler particles may be ceramic particles such as petrit T-S, xMT-1, perlite.

The coloured filler particles may be glossy metal particles, metallic powders, dark glass balls or other ceramic microspheres.

The coloured filler particles may be particles obtained by torrefaction of biomasses, such as wood fibres.

The veneer layer may be a wood veneer layer. The wood veneer layer may be selected from oak, maple, birch, walnut, ash, pine.

The veneer layer may have a thickness of less than 1 mm, such as 0.2-0.8 mm.

The sub-layer may comprise wear resistant particles.

The binder may be a thermoplastic binder or thermosetting binder. The thermosetting binder may be an amino resin.

The substrate may be wood based, the veneer element thereby forming a building panel.

The building panel may be a floor panel, a wall panel or a furniture panel.

In a third aspect, a veneer element is provided. The veneer element comprises a substrate, a sub-layer arranged on a first surface of the substrate, the sub-layer comprising a binder and coloured filler particles obtained from torrefaction of biomasses, and a veneer layer comprising defects and dense portions, the veneer layer being arranged on the sub-layer, wherein the sub-layer is visible through a defect of the veneer layer such as a crack, cavity, hole and/or knot.

The third aspect incorporates all the advantages of the first aspect, which previously has been discussed, whereby the previous discussion is applicable also to the building element. The previous disclosure relating to the first aspect is applicable also for the third aspect.

BRIEF DESCRIPTION OF THE DRAWINGS

The present invention will by way of example be described in more detail with reference to the appended schematic drawings, which show embodiments of the present invention.

FIG. 3A illustrates how a filler comprising free pigment flows when applying heat and pressure.

FIG. 3B illustrates how coarse filler particles flows when applying heat and pressure.

FIG. 4 illustrates the results of the sieving analysis of exemplary samples.

DETAILED DESCRIPTION

Figure 1A:
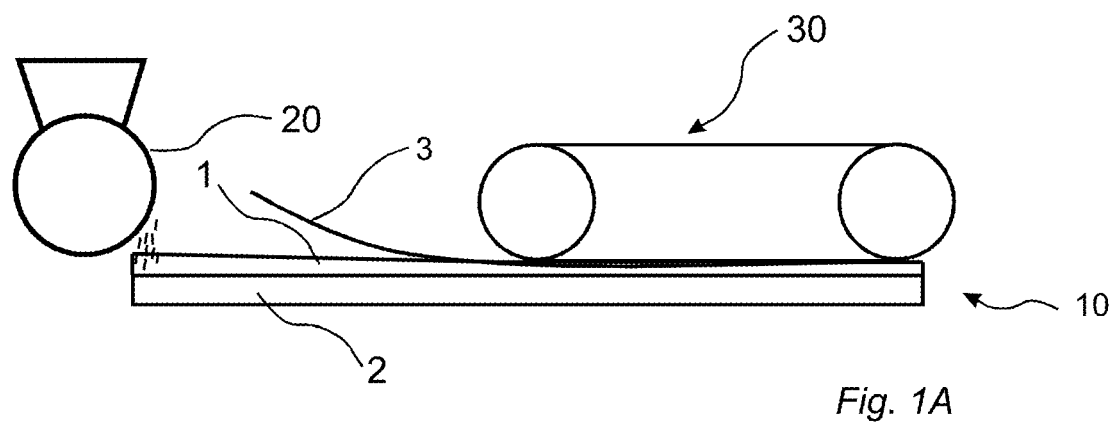
FIG. 1A shows a method to produce a veneer element.
Figure 1B:
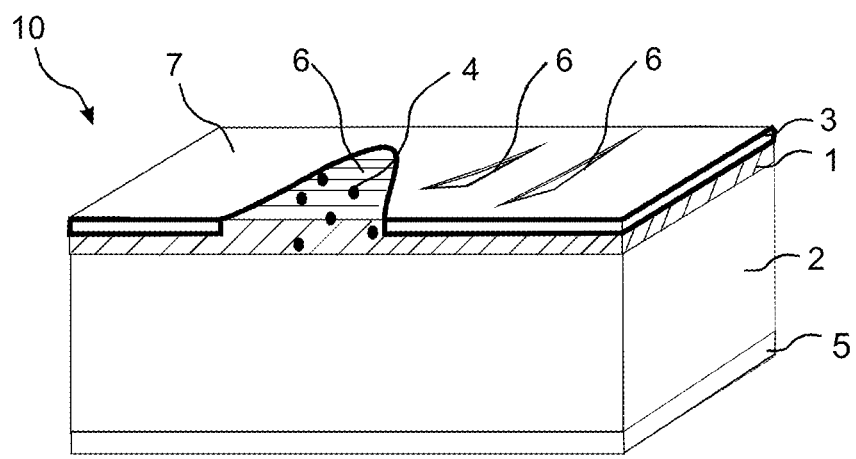
FIGS. 1B-C shows embodiments of a veneer element.
Figure 1C:
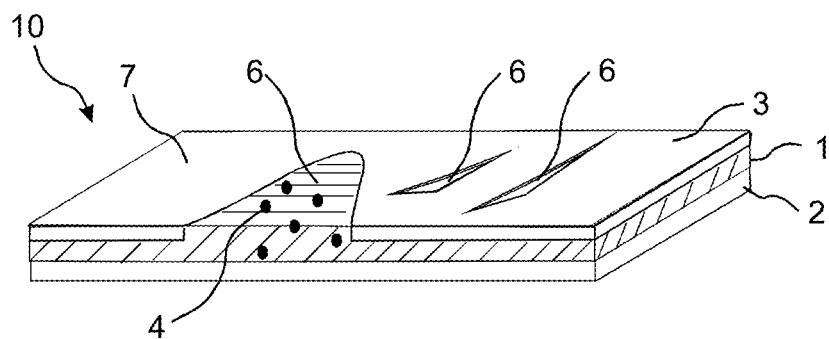

FIGS. 1B-C illustrates a cross-section of the veneer element 10 produced in accordance with the method of the present invention. FIG. 1A illustrates a method to produce a veneer element 10.

It is disclosed herein a method of producing a veneered element 10, comprising defects and dense portions, the method comprising: providing a substrate 2, providing a sub-layer 1, comprising a binder and coloured filler particles 4, wherein a size of the coloured filler particle is preferably at least 0.1 µm in diameter such as at least 1 µm in diameter, applying a sub-layer 1 on a first surface of the substrate 2, applying a veneer layer 3 on the sub-layer 1, applying heat and/or pressure to the veneer layer 3 and/or the substrate 2 thereby forming a veneer element 10 wherein, after pressing, the sub-layer 1 is visible through a defect 6 of the veneer element such as crack, cavity, hole and/or knot.

The method to produce the veneer element 10 and the veneer element will now be described in more details with reference to FIGS. 1A-C.

The veneer element 10 may be a furniture component, a building component, such as a floor panel, a wall panel, a door panel, a worktop, skirting boards, mouldings, edging profiles, etc.

The veneer element 10 comprises a veneer layer 3. The veneer layer 3 may be a wood veneer or a cork veneer. The veneer layer 3 described herein comprises defects 6 and dense portions 7.

A defect 6 in the veneer element 10 may be a crack, cavity, a hole and/or a knot. A defect 6 is an irregularity or abnormality found in the wood veneer. The defects 6 may include any portion of the veneer layer not being solid and/or dense. Cracks, cavities, splits, holes and/knots may be naturally occurring or be desired and formed during the production process, thereby forming defects 6 in the veneer layer 3. A defect 6 is a macroscopic opening in the veneer layer 3, such as having a size exceeding 1 mm. The defects 6 may be naturally occurring in the wood veneer due to broken limb or other injury, insect or fungal attack or rapid tree growth, or may be formed by abrasive machining, punching, tearing, brushing stretching, etc., prior to pressing of the veneer element. The defects 6 are transparent portions of the veneer layer.

A dense portion 6 of the veneer layer 3 may comprise porous portions, comprising microscopic openings comprising pores such as vessels and tracheids, and/or non-porous portions. A porous portion of the dense portion 7 of the veneer layer may in the context of the present disclosure be an opaque and/or translucent portion of the veneer layer. The translucency of the porous portion is due to the presence of pores in the wood, which are positioned in the proximity of each other. Each individual pore is a microscopic opening in the wood veneer, and multiple pores may be positioned adjacent each other thereby creating a translucent effect in the dense portions. Wood pores are typically microscopic openings having pore diameter of no more than 800 µm in diameter.

A non-porous portion of the dense portion 6 may be a non-translucent portion of the veneer layer 3.

In accordance with the method a substrate 2 is provided, as illustrated in FIG. 1B. The substrate 2 may comprise at least one wood veneer layer. The substrate 2 may comprise several wood veneer layers, such as being plywood. Preferably, the veneered element 10 includes uneven number of wood veneer layers.

The substrate 2 may comprise a wood-based panel. The wood-based panel may be selected from the group comprising of HDF, MDF, OSB, lamella core, and solid wood.

The substrate 2 may be a thermoplastic board. The substrate 2 may comprise a thermoplastic material. The substrate 2 may be a mineral composite board. The substrate 2 may be a fibre cement board. The substrate 2 may comprise a sheet such as a paper sheet or sheet of non-woven material or a conveyor.

The substrate 2 is preferably a pre-fabricated substrate, produced prior to the method of manufacturing a veneer element 10. A wood-based substrate 2 may be a wood fibre-based board such as MDF, HDF, particleboard or plywood board. The substrate may be a Wood Plastic Composite (WPC). The substrate 2 may be a mineral composite board. The substrate 2 may be magnesium oxide cement board. The substrate 2 may be a ceramic board. The substrate 2 may be a plastic board such as a thermoplastic board. The substrate 2 may be a carrier, such as a sheet of paper or non-woven sheet or a conveyor.

Further a sub-layer 1 is provided. The sub-layer 1 comprises a binder, which may be a thermoplastic binder or thermosetting binder. The thermosetting binder may be an amino resin such as melamine formaldehyde or urea formaldehyde. The thermosetting binder may be phenol formaldehyde.

The sub-layer 1 may further comprise conventional fillers may be particles or fibres, for example, wood fibres or particles, or mineral particles or fibres. The wood particles may be lignocellulosic particles and/or cellulosic particles.

The sub-layer 1 further comprises coloured filler particles 4. A size of a coloured filler particle is at least 0.1 μm in the diameter.

The coloured filler particles 4 in the context of the present disclosure mean a filler being organic filler particles, such as coffee, cacao vanilla, bark, or dark plastic particles, or ceramic particles such as petrit T-S, xMT-1, perlite, or particles being glossy metal particles, metallic powders, dark glass balls or other ceramic microspheres. It may be the case that more than one filler is present in a mixture. The mixture may comprise a combination of two or more fillers disclosed above.

Considered by the term particle is a powder component with a discrete quantity of matter and with the surface to the immediate surrounding, meaning either a single discrete component or two or more such components bound together chemically or physically by a coupling agent to form one solid unit of greater mass and/or size.

Coloured filler particles 4 are particles of the appearance which is a result of the way a particle reflects the light. Dark particle (or object) is an object devoid or partially devoid of light, such as not receiving, reflecting or transmitting light. Light coloured particle is to the contrary a particle, receiving, reflecting or transmitting light.

In the context of present disclosure, dark coloured filler particles 4 are particles which are more devoid of light than the sub-layer, such as glue, typically used in the art, such as a sub-layer free from coloured particles. Thereby, when dark coloured filler particles 4 are comprised in the sub-layer, the sub-layer 1 decreases its ability to receive, reflect or transmit a light compared to a sub-layer comprising no dark coloured particles. Thereby, a design of the veneer layer 3 may be controlled.

Dark coloured filler particles 4 are, for example, particles having an L value less than 67 such as less than 65 in CIELAB colour space model.

Light coloured particles are particles which transmit more light than the sub-layer and when added to the sub-layer increase an ability of the sub-layer to receive, reflect or transmit light.

The coloured filler particles 4 may be a supplement to a first filler material and may therefore be similar but not the same as the first filler material.

Coloured filler particles 4 in the context of the present disclosure include naturally coloured particles, such as coffee or vanilla, having a natural brown colour or coloured by chemical modification, such as dye coloured particles. Particles may be coloured by other means such as burning wood particles, which results in a dark colour obtained as a result of an exposure to elevated temperatures.

A coloured filler particle 4 in accordance with the disclosure may have a size of at least 0.1 μm in diameter such as at least 1 μm in diameter. An average particle size of said coloured filler particles 4 may be at least 0.1 μm in diameter such as at least 1 μm in diameter.

At least 70% of the coloured filler particles in the sub-layer may be of a size between 0.1 μm and 1 mm in diameter, preferably between 0.1 μm and 300 μm in diameter. In one embodiment, at least 70% of the coloured filler particles in the sub-layer may be of a size between 1 μm and 1 mm in diameter, preferably between 1 μm and 300 μm in diameter.

In accordance with some aspects, the coloured filler particles are particles obtained by torrefaction of biomasses, such as wood fibres.

Torrefaction is a mild form of pyrolysis at temperatures typically between 200 and 400° C. Torrefaction produces a dry product with very low or no biological activity like rotting. Torrefaction changes biomass properties to provide a better fuel quality for combustion and gasification applications. Therefore, typically the particles obtained by torrefaction of biomasses such as wood fibres or grains are used as an alternative biofuel.

In accordance with some aspects the product obtained as a result of torrefaction of biomasses may be advantageously used as coloured filler particles 4 in the method of producing a veneer element and in the veneer element.

Use of the torrefied particles as a filler provides several advantages. The torrefaction is typically performed at 200° C. to 400° C., which makes the biopolymers, such as cellulose, hemicellulose and lignin undergo partial decomposition.

The torrefied material has a lower degradation rate and improved water repellent properties compared to the fibres obtained from other sources, such as among others coffee grains, Petrit, etc., which has not been subjected to torrefaction.

The inventors discovered that the torrefied biomasses, an in particular wood fibres, has improved climate stability and are therefore suitable for use in the production of veneer element and in the veneer element.

It shall be understood that the size of a coloured filler particle 4 shall be suitable for the purpose. For example, a particle, having a length in at least one dimension larger than the thickness of the wood veneer is not suitable for use in a method in accordance with present invention.

The veneer layer 3 may be or comprise a wood veneer or cork veneer. The density of the wood veneer may be at least 1000 kg/m$^3$, for example, from 1000 to 5,000 kg/m$^3$. The wood veneer layer may be formed of compressed wood veneer. By the wood veneer having a density of at least 1000 kg/m$^3$, or being compressed to a density 1000 kg/m$^3$, the hardness of the wood veneer is increased. Wood veneer is a thin wood layer, for example having a thickness of 0.2-1 mm. The veneer layer 3 may be continuous or discontinuous, or non-continuous. The veneer layer 3 may be formed of several veneer pieces. The veneer layer may be overlapping or non-overlapping. A gap may be formed between the veneer pieces.

The sub-layer 1 may further comprise additives such as anti-static agents, and/or heat conductive additives, such as aluminium. Other possible additives are magnetic substances and/or catalysators and/or blowing agents.

The method comprises applying the sub-layer 1 on the first surface of the substrate 2, as shown in FIG. 1A. The sub-layer 1 may be applied by a scattering device 20. The sub-layer 1 may be applied in dry form, as in FIG. 1A, or may be applied in wet form or as a slurry.

Moisture may be applied to the sub-layer 1 prior to applying the veneer layer 3. The sub-layer 1 may be dried or stabilized, for example by IR or NIR.

Moisture may be applied on the veneer layer 3. The veneer has a porous structure in particular in dense portions, thus being permeable. The permeation is limited by the size of the pores, which are typically no more than 800 μm in diameter.

The veneer layer 3 is thereafter applied on the sub-layer 1. The sub-layer 1 may be applied in the amount of 100-600 g/m², preferably 250-500 g/m², such as about 300 g/m² or preferably 400-600 g/m².

The sub-layer 1 is applied on the substrate 2 and the veneer layer 3 is attached to the sub-layer 1 by applying heat and/or pressure to the veneer layer 3 and/or substrate 2. Preferably, pressure is applied. In the embodiment shown in FIG. 1A, pressure is applied in a pressing unit 30. Pressure applied may be a in a continuous pressure or a discontinuous pressure. The pressure is typically between 20 and 60 bars and temperature may be between 120° C. and 250° C.

After pressing, the sub-layer 1 is visible through a defect 6 of the veneer element such as crack, cavity, hole and/or knot of the veneer layer, as shown in FIGS. 1B-C. Preferably, a defect 6, such as a cavity, a crack a hole or a knot are visible as being coloured with the colour of the coloured filler particles.

Preferably, a defect 6 is at least partially filled with material from the sub-layer 1 such that the defect 6 is filled with material comprising the coloured filler particles 4. Preferably, the defects 6 are completely filled with material from the sub-layer 1, and in particular defects 6 such as crack, cavity, hole and/or knot is filled with the sub-layer.

Preferably, colour of the coloured filler particles 4 is darker than colour of the veneer layer.

An embodiment of the veneer element 10 is shown in FIG. 1B. In the embodiment shown in FIG. 1B, the veneer element 10 comprises a wood-based substrate 2, the sub-layer 1 of the above described type arranged on an upper surface of the substrate, and the veneer layer 3 arranged on the sub-layer 1. A balancing layer 5 is arranged on a surface of the core opposite the sub-layer 1.

In the embodiment in FIG. 1B, it is shown that coloured filler particles 4 are present in a defect 6 of the veneer layer 3, thus colouring the defect 6. Dense portions of the veneer layer 3 remains substantially uncoloured by the coloured filler particles 4 originating from the sub-layer 1. The coloured filler particles 4 have not permeated through porous portions of the dense portions 7 of the veneer layer 3.

An embodiment of the veneer element 10 is shown in FIG. 1C. In the embodiment shown in FIG. 1C, the veneer element 10 comprises a substrate 2 comprising a second veneer layer. The sub-layer 1 of the above described type is arranged on an upper surface of the substrate 2, and the veneer layer 3 arranged on the sub-layer 1.

In the embodiment in FIG. 1C, it is shown that coloured filler particles 4 are present in a defect 6 of the veneer layer 3, thus colouring the defect 6. Dense portions of the veneer layer 3 remains substantially uncoloured by the coloured filler particles 4 originating from the sub-layer 1. The coloured filler particles 4 have not permeated through porous portions of the dense portions 7 of the veneer layer 3.

Common for all embodiments is that during and after pressing, the sub-layer 1, the coloured filler particles 4 are at least partially prevented from permeating into the dense portions 7 of the veneer layer 3 by the particle size and their three-dimensional structure. Thereby an undesired colouring of the wood veneer 3 is at least partially prevented. Without any wish to be bound by any theory, the inventors consider that the large particles in accordance with the invention (at least 0.1 μm in diameter) cannot be carried over by a binder during curing process. As a consequence, a binder and a solid phase separate during curing process and allows only a binder to permeate the dense portion 7 of the veneer layer 3. At the same time both a binder and a solid phase are at least visible via defects 6, which is a macroscopic opening. In some embodiments, the defects 6 at least partially filled with the composition of the sub-layer 1.

It is also disclosed herein that the dense portions 7 are substantially free from the coloured filler particles 4 of at least 0.1 μm in diameter originated from the sub-layer 1. The veneer layer 3 has an appearance as only the defect portions 6 have a colour of the sub-layer 1 when a colour of the dense portions 7 remains largely unchanged.

The sub-layer 1 may be substantially free from free pigment(s). Free pigments typically have a particle size in a nanometer range. A pigment is typically coloured or fluorescent particulate organic or inorganic divided solids which are typically insoluble in and essentially chemically unaffected by the vehicle or medium in which they are incorporated.

When the sub-layer 1 is irreversibly attached to the substrate the veneer element 10 forms a building panel as shown in FIGS. 1B-C. Irreversibly means that the substrate cannot be detached from the at least the sub-layer 1 and a veneer layer 3 after they have been attached to the substrate 2 by applying heat and/or pressure.

It is further disclosed, as shown in FIGS. 1B-C, that a defect 6 such as a crack, cavity, hole and/or knot of the veneer layer 3 is at least partially filled with material originating from the sub-layer 1, comprising the coloured filler particles 4. A defect or any defects 6 may be filled with the material originating from the sub-layer 1.

It is further disclosed that in a method after pressing the dense portions 7 are substantially free from the coloured filler particles 4 of at least a diameter of 0.1 μm of the sub-layer 1.

A balancing layer 5 may also be arranged on a lower surface of the substrate 2, as shown in FIG. 1B. The balancing layer 5 may be a powder based balancing layer, applied as a powder. The balancing layer 5 may be a resin impregnated paper. The balancing layer 5 may comprise a veneer layer, such as wood veneer or cork veneer. When the balancing layer 5 is a veneer layer, there may be an additional sub-layer (not shown) positioned between the substrate 2 and the balancing layer 5. A balancing layer may be the same as sub-layer 1.

Furthermore, a protective layer (not shown) may be applied to the veneer layer 3. The protective layer may be a coating, such as one or several lacquer layers. The coating may be an acrylate or methacrylate coating, such as polyurethane coating. The coating may comprise wear and/or scratch resistant particles. The protective layer may be an overlay paper comprising wear resistant particles. The protective layer may be a powder overlay, as described in WO 2011/129755, comprising processed wood fibres, a binder and wear resistant particles applied as a mix on a veneer surface.

The veneer element 10 may further be treated in different ways, for example, brushed, oiled, lacquered, or waxed. A protective coating may be applied prior to the step of applying heat and/or pressure. Thereby the protective layer is cured and attached to the veneer layer.

The protective coating may also be applied prior to or after pressing.

It is further disclosed herein that at least 70% of the coloured filler particles 4 in the sub-layer 1 are of a size between 0.1 µm and 1 mm in diameter, preferably between 0.1 µm and 300 µm. The particle distribution is not even, however, when at least 70% of the particles are of the size between 0.1 µm and 300 µm, the sub-layer 1 is at least partially prevented from permeating into any dense portion 7 of the wood veneer 3.

It is further disclosed herein that the coloured filler particles 4 are provided in a dry form. In some embodiments the coloured filler particles 4 of size at least 0.1 µm in diameter may be applied as a dry powder. Alternatively, the sub-layer 1 may be provided in a wet form or as a slurry.

It is further disclosed herein that coloured filler particles 4 are organic filler particles of size of at least a diameter of 0.1 µm may be coffee, cacao vanilla, or bark.

It is further disclosed herein that coloured filler particles 4 of a size of at least 0.1 µm in diameter may be dark plastic particles, preferably dark plastic particles.

It is further disclosed herein that coloured filler particles 4 of a size of at least 0.1 µm or more may be ceramic particles such as petrit T-S, xMT-1, or perlite.

It is further disclosed herein that coloured filler particles 4 of a size 0.1 µm or more may glossy metal particles, metallic powders, dark glass balls or other ceramic microspheres.

A building element according to the above aspect of the present invention incorporates all the advantages of the method, which previously has been discussed, whereby the previous discussion is applicable also to the building element.

EXAMPLES

Example 1

Testing of Various Filler Materials

Several dark coloured filler materials, listed as additives 1 to 11 (Table 1), were selected because of their different properties, material classes and varying shape and size. However, the size was still within the desired particle range for this application of at least 0.1 µm in diameter.

TABLE 1

Coloured filler particles used.

| No. | Additive name | Material class | Particle characteristic |
|---|---|---|---|
| 1 | Petrit T | Metallic/ceramic blend | Powder |
| 2 | Petrit T-S | Metallic/ceramic blend | Granules |
| 3 | MT-1 | Metallic with high carbon content | Powder |
| 4 | Brown pellets | Organic | Grinded to fibrous powder |
| 5 | Coffee (coarse) | Organic | Grinded coarsely to powder |
| 6 | Coffee (Fine) | Organic | Grinded finely to powder |
| 7 | Distaloy AE | Metal | Water atomized iron powder alloy |
| 8 | Arbocel Spheres (black) | Organic | Spherical granulate |
| 9 | Vitacel AF-401 (apple fibre) | Organic | Fibrous powder |

TABLE 1-continued

Coloured filler particles used.

| No. | Additive name | Material class | Particle characteristic |
|---|---|---|---|
| 10 | Cocoa fibre | Organic | Fibrous powder |
| 11 | Bark | Organic | Powder |
| 12 | Heat treated Sonae 300 | Organic | Fibrous powder |
| 13 | Dyed Sonae 300 | Organic | Fibrous powder |

Additive with number 13 in Table 1 was prepared by dyeing the Sonae 300 fibre using Nova hybrid ruby dye at 1 wt % of the fibre. The material was then thoroughly washed with water in order to eliminate any loose dye, leaving only the now coloured fibre. This fibre was dried and used as filler in a powder formulation and processed like the samples 1-10 mentioned above.

For additive 12 the Sonae 300 fibre was heat treated on an oven until it partly underwent thermal combustion in air, which coloured the fibre darker, i.e. decreased its ability to transmit light. This fibre was then used as filler in a powder formulation and processed like samples 1-11.

These additives with numbers 1-12 in Table 1 were then individually added to a powder recipe further comprising wood fibres in an amount of 35-44 wt %, a melamine-formaldehyde resin in an amount of 52-53 wt %. The powder was then scattered on a board, exposed to watering and IR-heating, tested by hand whether the adhesion to the board improved by the additive and finally heat pressed for 35 s in 40 bar and 180° C. with oak and/or birch veneer as a top layer. After pressing the samples were visually inspected in accordance with the rating system described in Table 2. The sample graded with A, B or C were considered suitable for the application. The samples with score D were regarded as non-suitable.

TABLE 2

Rating system used in the experiment

| Rating | Permeation of veneer pores | Cohesion to board | Colouring effect |
|---|---|---|---|
| A | No permeation | Very good cohesion | Heavy colouration |
| B | Very light permeation | Good cohesion | Clear colouration |
| C | Light permeation | Decent cohesion | Light colouration |
| D | Heavy permeation | Poor cohesion | No visible colouration |

The results of the experiment are summarized in Table 3.

TABLE 3

Score awarded to the coloured fillers tested

| Sample No. | Additive name | Permeation of veneer pores | Cohesion to board | Colouring effect |
|---|---|---|---|---|
| 1 | Petrit T | C | B | A |
| 2 | Petrit T-S | A | C | C |
| 3 | MT-1 | B | A | B |
| 4 | Brown pellets | A | A | A |
| 5 | Coffee (coarse) | A | B | C |
| 6 | Coffee (Fine) | C | A | B |
| 7 | Distaloy AE | A | C | C |
| 8 | Arbocel Spheres (black) | B | B | B |
| 9 | Vitacel AF-401 (apple fibre) | C | B | C |

TABLE 3-continued

Score awarded to the coloured fillers tested

| Sample No. | Additive name | Permeation of veneer pores | Cohesion to board | Colouring effect |
|---|---|---|---|---|
| 10 | Cocoa fibre | A | B | C |
| 11 | Bark | A | A | A |
| 12 | Heat treated Sonae 300 | A | A | A |
| 13 | Dyed Sonae 300 | B | B | B |

The test samples were compared to the reference of the extreme points as defined in Table 4. The reference samples 14 and 15 served to show the extreme points, sample 14 having desired knot colour strength but undesirably high pore discoloration and sample 15 the opposite.

TABLE 4

Description of reference samples

| Reference sample | Dark coloured additive |
|---|---|
| 14 | Pigment |
| 15 | None |

Figure 2A:
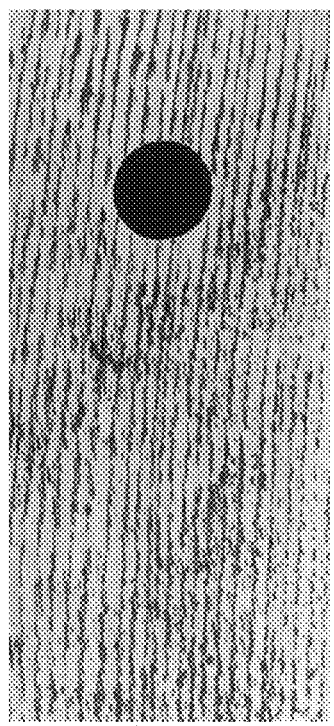
FIGS. 2A-C illustrates the results of a permeation experiment detailed in Example 1.
Figure 2B:
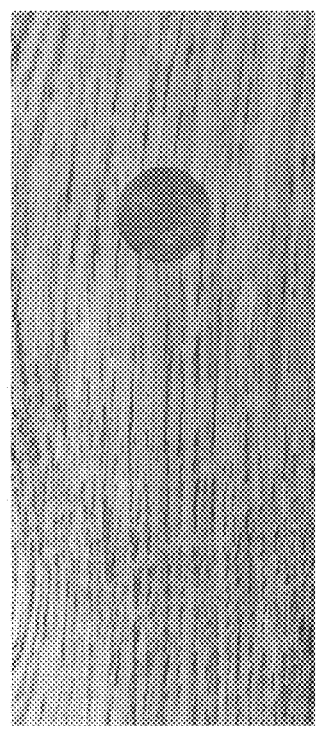
Figure 2C:
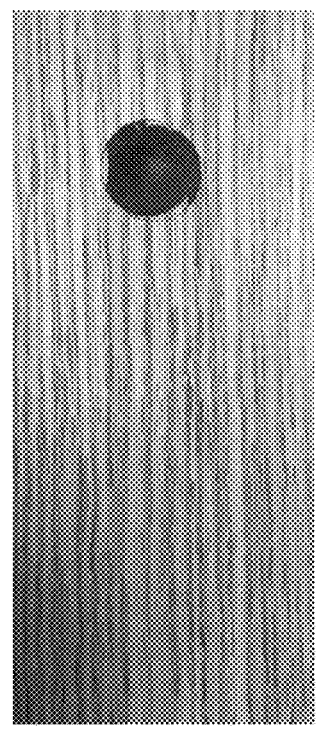

The comparison results for a high performed sample 12 are shown in FIGS. 2A-C. FIGS. 2A-C illustrate the results of a permeation experiment detailed in Example 1. The embodiment of the sample 12 of an embodiment of the present invention (FIG. 2C) compared to the reference sample 14, coloured with low-particle size pigment (FIG. 2A) and 15, wherein no colouring agent has been added to a filler (FIG. 2B).

FIG. 2A is a reference sample 14, FIG. 2B is a reference sample 15 and FIG. 2C is a highly performed sample 12.

As apparent from FIG. 2A the defect has a desired dark colour in the defect, however the dense portions are also dark (which is undesired, because it creates a "dirty appearance"). It may be speculated that the effect is due to a free pigment permeating pores of the veneer layer.

As apparent from FIG. 2B, the defect is stained with light colour of the sub-layer and the veneer layer is not coloured. The light colour filling in the defect is often perceived by the consumer as a spot and therefore is not aesthetically appealing.

FIG. 2C is a highly performed sample 12, wherein the defect is visible as darker than the dense portions of the veneer element and the dense portions are essentially free from the dark stains, thereby creating a desired appearance of the product.

The score of the sample 12 and the control samples 14 and 15 are presented in Table 5.

TABLE 5

Score of the samples 12 to 15.

| Sample N | Permeation | Colour effect |
|---|---|---|
| 12 | A | A |
| 14 | D | A |
| 15 | A | D |

Example 2

Following was performed in order to prove that fine particles of a size less than 0.1 μm, such as free pigments in the formulation are easily carried by the melamine formaldehyde resin melt flow when applying heat and pressure. On the contrary, coarse particles of the size at least 0.1 μm in diameter e.g. dark coloured filler particles like a burned Sonae 300 fibre or a grinded brown pellet would have the binder separate from the solid loading under when melting under heat and pressure. Pucks were formed from different powders, comprising a melamine-formaldehyde resin, wood fibre, and either pigments or dark fillers. These pucks were then cured under heat and pressure, where the binder would, in case of separation from the solid phase create a transparent rim of the pressed puck, whereas this rim would be opaque if the coloured solid loading was carried by the melt phase.

TABLE 6

Colouring agents used in Example 2.

| Sample | Colouring additive |
|---|---|
| 1 | Printex 60 (pigment) |
| 2 | MT-1 (colour filler, particle size more than 0.1 pm in diameter) |

Results of the experiment are shown in FIG. 3. FIGS. 3A-B illustrate how the filler comprising free pigment (FIG. 3A) compared to coarse filler particles (FIG. 3B) flows when applying heat and pressure.

As clearly visible from FIG. 3A, the rim for sample 1 was black coloured by the pigment, whilst on FIG. 3B showing sample 2, the binder was unable to carry the particles out from the centre, leaving the rim transparent.

Example 3

The scope of this experiment was to evaluate how particle size, characteristic and density affected the permeation results from Example 1. Sieving analysis of different additives was conducted according to the parameters defined in Table 7. The additives tested are presented in Table 8 and the sieving results are visualized on FIG. 4. FIG. 4 illustrates the results of the sieving analysis of the samples, wherein it is apparent that the majority of the coloured filler particles are of at least 0.1 μm or more in diameter, preferably between 0.1 μm and 300 μm in diameter.

That while fine coffee particles and Petrit T shown an acceptable degree of permeation (Table 8), an increase in particle size to the coarse Coffee and Pertite T-S further decreased or eliminated a degree of permeation into the dense portions of the veneer layer.

TABLE 7

Sieving parameters.

| | |
|---|---|
| Sample mass: | 50 g |
| Sieve time: | 20 min |
| Amplitude: | 1.8 mm |
| No. of Balls: | 5 |

TABLE 8

Overview of additives evaluated in the experiment.

| Sample no. | Additive name | Permeation (from Example 1) | Particle characteristic |
|---|---|---|---|
| 1 | Petrit T | C | powder |
| 2 | Petrit T-S | A | granules |

TABLE 8-continued

Overview of additives evaluated in the experiment.

| Sample no. | Additive name | Permeation (from Example 1) | Particle characteristic |
|---|---|---|---|
| 3 | Brown pellets (grinded) | A | Grinded to fibrous powder |
| 4 | Coffee (coarse) | A | Grinded coarsely to powder |
| 5 | Coffee (Fine) | C | Grinded finely to powder |

Example 4

The scope of the experiment was to evaluate a climate stability of the torrefied wood fibre product compared to a reference material.

A torrefied wood fibre product was tested against a reference material. The reference material used was the ground HDF (high density fibre) board. The ground HDF wood fibre is considered having an acceptable climate stability and is routinely used for producing of indoor panels, such as floor panels.

TABLE 9

Sample description.

| Sample | Material |
|---|---|
| A | Torrefied wood fibres |
| B | Ground HDF board |

The raw materials A and B were measured for moisture content at 105° C. Equal amounts, approximately 50 g of each sample A and B were weighed in at 23° C. and 50% RH (relative humidity) and placed in a climate chamber at 23° C. and 85% RH for 5 days. Thereafter, both materials were measured for moisture content again. Moisture content has been measured by measured by an infrared moisture analyzer scale, which weighs the sample during the whole heating and evaporation step. The analyzer continues heating until no weight change can be detected for 30 s and the moisture content is thereby presented as $$\text{Moisture content} = \frac{\text{Initial weight} - \text{end weight}}{\text{end weight}} \times 100\%.$$

As can be seen in Table 10 both materials experience a similar moisture uptake, possibly with a subtle favor to sample A, the torrefied powder. These results demonstrate that sample A exhibits climate stability comparable to the reference sample B, and thereby higher than virgin wood and cellulose fibres. Thus, the torrefied material is suitable for use in producing of indoor panels.

TABLE 10

Results of moisture content measurements.

| Material | Moisture content at 50% RH (%) | Moisture content at 85% RH (%) | Moisture content change (% units) |
|---|---|---|---|
| A | 4.14 | 8.93 | +4.79 |
| B | 4.35 | 9.34 | +4.99 |

It is contemplated that there are numerous modifications of the embodiments described herein, which are still within the scope of the invention as defined by the appended claims. For example, it is contemplated that more than one wear resistant foil may be arranged on a core for forming a building panel.

EMBODIMENTS

1. A method to produce a veneer element (10), comprising defects (6) and dense portions (7), the method comprising:
   providing a substrate (2),
   providing a sub-layer (1), comprising a binder and coloured filler particles (4), wherein a size of the coloured filler particles (4) is at least 0.1 μm in diameter,
   applying the sub-layer (1) on a first surface of the substrate (2),
   applying a veneer layer (3) on the sub-layer (1), and
   applying pressure, preferably heat and pressure, to the veneer layer (3) and/or the substrate (2), thereby forming a coloured veneer element (10) wherein, after pressing, the sub-layer (1) is visible through a defect (6) of the veneer element (10) such as a crack, cavity, hole and/or knot of the veneer layer (3).

2. The method according to embodiment 1, wherein, after pressing, the veneer element (10) comprises said defects (6) forming coloured portions and said dense portions (7) forming non-coloured portions.

3. The method according to embodiment 1 or 2, wherein, during pressing, a defect (6) of the veneer layer (3) such as a crack, cavity, hole and/or knot of the veneer layer is at least partially filled with material originating from the sub-layer (1), comprising the coloured filler particles (4).

4. The method according to any one of the preceding embodiments, wherein, after pressing, the dense portions (7) of the veneer layer (3) are substantially free from the coloured filler particles originating from the sub-layer.

5. The method according to any one of the preceding embodiments, wherein at least 70% of the coloured filler particles (4) are of a size between 0.1 μm and 1 mm in diameter, preferably between 0.1 μm and 300 μm in diameter.

6. The method according to any one of the preceding embodiments, wherein a size of the coloured filler particle (4) is at least 1 μm in diameter.

7. The method according to any one of the preceding embodiments, wherein at least 70% of the coloured filler particles (4) are of a size between 1 μm and 1 mm in diameter, preferably between 1 μm and 300 μm in diameter.

8. The method according to any one of the preceding embodiments, wherein an L value (lightness value) of the coloured filler particles is less than 67, preferably less than 65, in the CIELAB colour space model.

9. The method according to any one of the preceding embodiments, wherein the coloured filler particles (4) are provided in a dry form.

10. The method according to any one of the preceding embodiments, wherein the coloured filler particles (4) are organic filler particles, such as coffee, cacao vanilla, bark.

11. The method according to any one of the embodiments 1-9, wherein the coloured filler particles (4) are plastic particles, preferably dark plastic particles.

12. The method according to any one of the embodiments 1-9, wherein the coloured filler particles (4) are ceramic particles such as petrit T-S, xMT-1, perlite.

13. The method according to any one of the embodiments 1-9, wherein the coloured filler particles (4) are glossy metal particles, metallic powders, dark glass balls or other ceramic microspheres.

14. The method according to any one of the embodiments 1-9, wherein the coloured filler particles (4) are particles obtained by torrefaction of biomasses, such as wood fibres.

15. The method according to any one of the preceding embodiments, wherein the binder is a thermoplastic binder or thermosetting binder.

16. The method according to any one of the preceding embodiments, wherein the veneer element (10) is a building panel.

17. A veneer element (10), comprising
a substrate (2),
a sub-layer (1) arranged on a first surface of the substrate (2), the sub-layer (1) comprising a binder and coloured filler particles (4), wherein a size of the coloured filler particle (4) is at least 0.1 μm in diameter, and
a veneer layer (3) comprising defects (6) and dense portions (7), the veneer layer (3) being arranged on the sub-layer (1),
wherein the sub-layer (1) is visible through a defect (6) of the veneer layer (3) such as a crack, cavity, hole and/or knot.

18. The veneer element according to embodiment 17, wherein said defects (6) forming coloured portions and said dense portions (7) forming non-coloured portions.

19. The veneer element according to embodiment 17 or 18, wherein a defect (6) such as a crack, cavity, hole and/or knot of the veneer layer (3) is at least partially filled with material originating from the sub-layer (1), comprising the coloured filler particles (4).

20. The veneer element according to any one of embodiments 17-19, wherein the dense portions (7) of the veneer layer (3) are substantially free from the coloured filler particles (4) originating from the sub-layer (1).

21. The veneer element according to any one of embodiments 17-20, wherein at least 70% of the coloured filler particles (4) are of a size between 0.1 μm and 1 mm in diameter, preferably between 0.1 μm and 300 μm in diameter.

22. The veneer element according to any one of embodiments 17-21, wherein a size of the coloured filler particle (4) is at least 1 μm in diameter.

23. The veneer element according to any one of embodiments 17-22, wherein at least 70% of the coloured filler particles (4) are of a size between 1 μm and 1 mm in diameter, preferably between 1 μm and 300 μm in diameter.

24. The veneer element according to any one of embodiments 17-23, wherein an L value (lightness value) of the coloured filler particles is less than 67, preferably less than 65, in the CIELAB colour space model.

25. The veneer element according to any one of embodiments 17-24, wherein the coloured filler particles (4) are organic filler particles, such as coffee, cacao vanilla, bark.

26. The veneer element according to any one of embodiments 17-24, wherein the coloured filler particles (4) are dark plastic particles.

27. The veneer element according to any one of embodiments 17-24, wherein the coloured filler particles (4) are ceramic particles such as petrit T-S, xMT-1, perlite.

28. The veneer element according to any one of embodiments 17-24, wherein the coloured filler particles (4) are glossy metal particles, metallic powders, dark glass balls or other ceramic microspheres.

29. The veneer element according to any one of embodiments 17-24, wherein the coloured filler particles (4) are particles obtained by torrefaction of biomasses, such as wood fibres.

30. The veneer element according to any one of embodiments 17-29, wherein the binder is a thermoplastic binder or thermosetting binder.

31. The veneer element according to any one of embodiments 17-30, wherein the substrate (2) is wood based, the veneer element (10) thereby forming a building panel.

The invention claimed is:

1. A method to produce a veneer element, the method comprising:
providing a substrate,
providing a sub-layer, comprising a binder and coloured filler particles, wherein a size of the coloured filler particles is at least 0.1 μm in diameter and the coloured filler particles have a lightness value (L-value) that is less than 67 in a CIELAB colour space mode,
applying the sub-layer on a first surface of the substrate,
applying a veneer layer on the sub-layer, wherein the veneer layer comprises defects and dense portions, and
applying pressure to the veneer layer and/or the substrate, thereby forming a coloured veneer element wherein, after application of the pressure, the sub-layer is visible through at least one of the defects of the veneer layer.

2. The method according to claim 1, wherein, after pressing, said defects form coloured portions and said dense portions form non-coloured portions.

3. The method according to claim 1, wherein, during the application of the pressure, at least one of the defects of the veneer layer is at least partially filled with material originating from the sub-layer, wherein the material comprises the coloured filler particles.

4. The method according to claim 1, wherein, after the application of the pressure, the dense portions of the veneer layer are substantially free from the coloured filler particles originating from the sub-layer.

5. The method according to claim 1, wherein at least 70% of the coloured filler particles are of a size between 0.1 μm and 1 mm in diameter.

6. The method according to claim 1, wherein a size of the coloured filler particle is at least 1 μm in diameter.

7. The method according to claim 1, wherein at least 70% of the coloured filler particles are of a size between 1 μm and 1 mm in diameter.

8. The method according to claim 1, wherein the coloured filler particles are provided in a dry form.

9. The method according to claim 1, wherein the coloured filler particles are organic filler particles.

10. The method according to claim 1, wherein the coloured filler particles are plastic particles.

11. The method according to claim 1, wherein the coloured filler particles are ceramic particles.

12. The method according to claim 1, wherein the coloured filler particles are metal particles, metallic powders, dark glass balls or other ceramic microspheres.

13. The method according to claim 1, wherein the coloured filler particles are particles obtained by torrefaction of biomasses.

14. The method according to claim 1, wherein the binder is a thermoplastic binder or thermosetting binder.

15. The method according to claim 1, wherein the veneer element is a building panel.

16. A method to produce a veneer element, the method comprising:

providing a substrate, providing a sub-layer, comprising coloured filler particles, wherein a size of the coloured filler particles is at least 0.1 µm in diameter and the coloured filler particles have a lightness value (L-value) that is less than 67 in a CIELAB colour space model, applying the sub-layer on a first surface of the substrate, applying a veneer layer on the sub-layer, wherein the veneer layer comprises defects, and applying pressure to the veneer layer and/or the substrate, thereby forming a coloured veneer element wherein, after the application of the pressure, the sub-layer is visible through at least one of the defects of the veneer layer.

17. The method according to claim 16, wherein the coloured filler particles are particles obtained by torrefaction of biomasses.

* * * * *